CANCELLATION OF LOW FREQUENCY COMPONENTS IN MODULATOR OUTPUT

Filed Aug. 22, 1962

INVENTOR:
ROBERT B. DOME,

BY Joseph Levinson
HIS ATTORNEY.

United States Patent Office 3,159,802
Patented Dec. 1, 1964

3,159,802

CANCELLATION OF LOW FREQUENCY COMPONENTS IN MODULATOR OUTPUT

Robert B. Dome, Geddes Township, Onondaga County, N.Y., assignor to General Electric Company, a corporation of New York Filed Aug. 22, 1962, Ser. No. 218,579
7 Claims. (Cl. 332—37)

Figure 1:
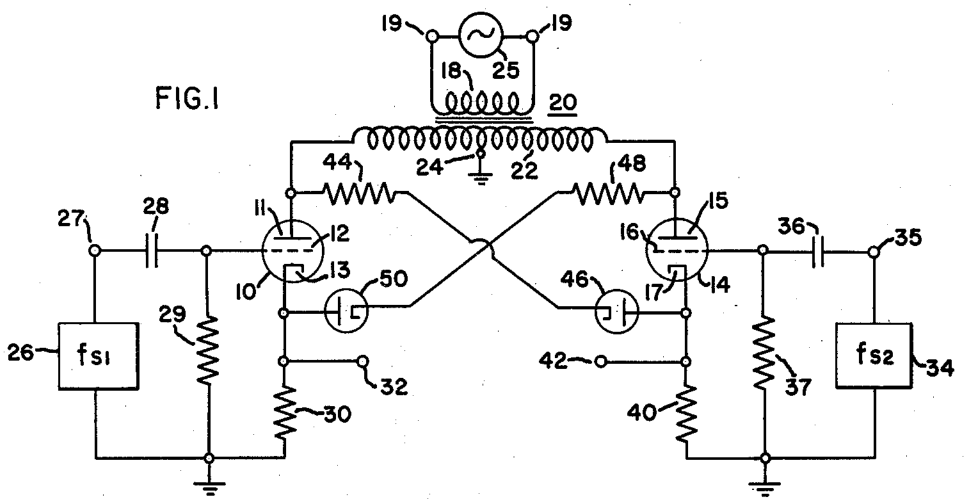

This invention relates to an unbalanced modulator circuit for providing cancellation of modulating frequency components in the output of such a circuit.

When a modulator circuit is fed input signals such as a high frequency carrier signal and a low frequency modulating signal, it is desirable that the output of the modulator contain only signals arising from the presence of the carrier signal which includes the carrier signal itself and sidebands representing the carrier signal plus and minus the modulating frequencies. The output of the modulator should not contain remnants of the modulating frequencies and their harmonics because these frequencies may interfere with distortionless direction of the output signal and exhibit undesired spurious signals in the detected output.

It is therefore an object of this invention to provide an improved modulator circuit having an output which is substantially free of modulating frequencies and their harmonics.

In balanced type modulators, the carrier wave is introduced in such a way that it does not appear in the output where only the sidebands appear. Balanced modulators are also generally characterized by having a minimum of low frequency content. However, unbalanced type modulators which are often convenient to use have the drawback that the modulating frequency components are not balanced out.

Accordingly, it is an object of this invention to provide an improved modulator circuit wherein modulation components are balanced out even though the modulator is of the unbalanced type.

An unbalanced modulator is utilized in a television stereo-sound system described in applicant's patent application Serial No. 150,562. In such a system when orchestral music is being transmitted the spurious signals are fairly well masked by the complex sidebands, but when the modulating signal consists of a single frequency, the spurious audio signal can be heard in the background of the detected signal.

Therefore, it is a further object of this invention to provide a modulator circuit for suppressing such spurious signals to a level where they are no longer objectionable.

In carrying out this invention in one illustrative embodiment thereof, a pair of electron discharge devices are provided having their anode circuits connected to opposite ends of a center tapped secondary winding of a transformer to which a modulating frequency is fed. Signals which are to be modulated are applied to the input electrodes of the electron discharge devices and the modulated output appears across load circuits in the cathodes of the electron discharge devices. Cancellation means are coupled between anode and the cathode of the other electron discharge device for coupling the modulating or low frequency component of equal amplitude and opposite phase to each cathode for providing cancellation of the low frequency components in the output circuits.

Figure 2:
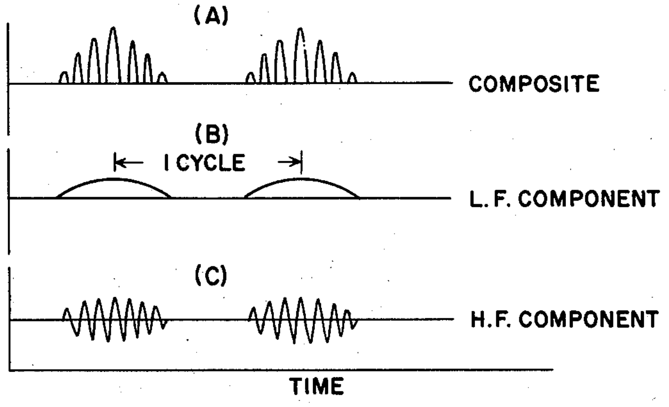
Figure 3:
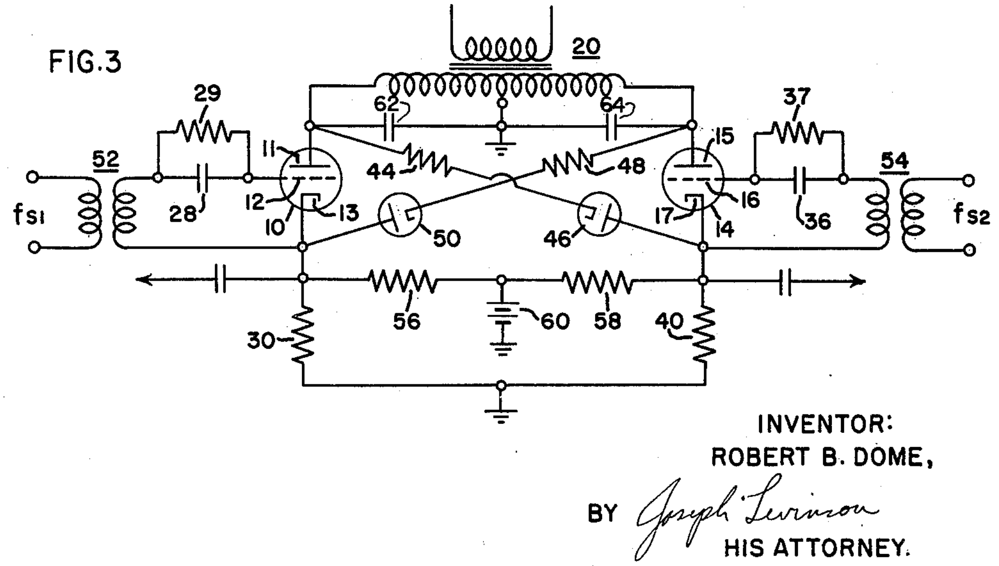

The invention, both as to organization and method of operation, together with further objects and advantages thereof may best be understood by reference to the following description taken in connection with the accompanying drawings, in which:

FIGURE 1 is a schematic diagram of the improved modulator for providing cancellation of modulating frequency components embodied in this invention, FIGURE 2 is an explanatory series of graphs in which output current is plotted versus time for one of the electron discharge devices utilized in the circuit of FIGURE 1, and FIGURE 3 is another embodiment of the improved modulator embodied in this invention.

When the carrier frequencies in the modulators are relatively low as is the case in the above referred to patent application for television stereo sound, and are for example 23.625 kilocycles and 39.375 kilocycles, respectively, a 6 kilocycle modulating frequency can produce a spurious signal at four times this frequency or at 24 kilocycles. The desired sidebands are produced at 23.625 ±6 or at 17.625 kilocycles and at 29.625 kilocycles and at 29.625 kilocycles and combine with the carrier to produce the desired 6 kilocycle signal. However, the 24 kilocycle spurious signal combines with the 23.625 kilocycle carrier to produce a spurious audio signal at 375 cycles per second. The circuits as shown in FIGURES 1 and 3 are provided to substantially eliminate the spurious signal at 24 kilocycles, and hence to substantially eliminate the 375 cycles per second spurious audio output signal at the receiver.

Referring now to FIGURE 1, the modulator shown includes a pair of electron discharge devices 10 and 14 each having cathode electrodes 13 and 17, control electrodes 12 and 16, and anode electrodes 11 and 15 respectively. The anode electrodes 11 and 15 are connected to opposite ends of a secondary winding 22 of a transformer 20. The secondary winding 22 of the transformer 20 has a center tap 24 which is connected to ground. The transformer 20 includes a primary winding 18 having a pair of input terminals 19 to which a source 25 of modulating frequency is applied. The cathodes 13 and 17 are connected to ground through resistors 30 and 40, respectively. The resistor 30 provides a load circuit for the electron discharge device 10 and has an output terminal 32. The resistor 40 provides a load circuit for the electron discharge device 14 and is provided with an output terminal 42. A source of subcarrier signal 26 is connected across an input terminal 27 and ground and applied to the control electrode 12 of electron discharge device 10 via a coupling capacitor 28 and a grid leak resistor 29. Another source of subcarrier signal 34 is coupled between an input terminal 35 and ground via a coupling capacitor 36 and a grid leak resistor 37 to the control grid 16 of the electron discharge device 14.

The circuit of FIGURE 1 as so far described provides alternatingly a subcarrier signal across output terminal 32 and output terminal 42 in the presence of a modulating signal 25. The anodes 11 and 15 of tubes 10 and 14 are connected to ground for direct current through the grounded center tap 24 of secondary winding 22. Accordingly, plate power is supplied to the electron discharge devices 10 and 14 only when a modulating signal 25 appears across the primary winding 18. Therefore, tubes 10 and 14 will conduct only in the presence of a modulating signal 25. The transformer 20 has its windings phased such that on a positive alternation of the modulating frequency 25 the anode 11 of tube 10 is driven positive while the anode 15 of tube 14 is driven negative with respect to ground. Accordingly, plate current flows in electron discharge device 10 having a waveform as shown in FIGURE 2A which will appear at the output terminal 32. Likewise, on the negative alternation of the modulating signal 25, anode 15 is driven positive while anode 11 is driven negative with respect to ground potential. Plate current then flows in electron discharge device 14 having a frequency corresponding to the frequency of the subcarrier source 34.

Referring now to FIGURE 2, the waveform of current appearing across cathode resistor 30 is shown in FIGURE 2A. FIGURE 2A shows a composite wave which consists of a low frequency component and a high frequency component. FIGURE 2B shows the low frequency component. The latter low frequency component is the one which is desired to be minimized or cancelled out. FIGURE 2C shows the result of eliminating the low frequency component.

For providing the elimination of such a low frequency component, a resistor 48 and a unilateral conducting device 50 are connected serially between the anode 15 of electron discharge device 14 and the cathode 13 of electron discharge device 10. Similarly, a resistor 44 and a unilateral conducting device 46 are serially connected between the anode 11 of electron discharge device 10 and the cathode 17 of electron discharge device 14. By proper adjustment of the resistance of the resistor 48, it is possible to set up a wave across the cathode resistor 30 that is the same as the low frequency component shown in FIGURE 2B, but opposite in algebraic sign to cause cancellation of such low frequency components. The proper adjustment of resistor 44 will effect cancellation across resistor 40 in a similar manner for electron discharge device 14. The resistances of resistors 44 and 48 depend upon the values of plate resistances of the electron discharge devices 10 and 14, upon the values of the cathode resistors 30 and 40, and upon the wave shape of the high frequency pulses of plate current present in the anode circuits of the modulator. It should be noted that the unilateral conducting devices 46 and 50 are poled to conduct when their corresponding electron discharge device is conducting to produce a cancellation voltage of equal magnitude and opposite phase across its respective load circuit. Accordingly, rectifier 50 is poled to conduct when electron discharge device 10 is conducting and similarly rectifier 46 is poled to conduct when the electron discharge device 14 is conducting.

It is possible to make a theoretical calculation of the value of resistance required for the resistors 44 and 48 as follows:

Let $r_p$ be the actual plate resistance as provided in the tube manual.
Let $R_k$ be the cathode resistor.
Let $\mu$ be the amplification factor of the tube.
Let the wave shape of $f_{s1}$, the carrier wave, be rectangular with a 50% duty cycle (square wave).

Then, as a tube for *low* frequency use, the effective plate resistance is $$R_p'=r_p+(\mu+1)R_k$$

The fact that the duty cycle is 50% and not 100%, will cause the effective resistance to double, or $$R_p=\frac{r_p+(\mu+1)R_k}{d}=\frac{r_p+(\mu+1)R_k}{0.5}=2[r_p+(\mu+1)R_k]$$

where $d$=duty cycle.

If the tube is a 12AU7, where $r_p$=6500 ohms and $\mu$=19, and the value of $R_k$=1000 and $d$=0.5, $$R_p=\frac{6500+(19+1)1000}{0.5}=53,000 \text{ ohms}$$

The low frequency output across $R_k$ is therefore $$e_{o1}=\frac{E_pR_k}{R_p+R_k}=\frac{E_p(1000)}{54,000}=0.0185E_p$$

where $E_p$=voltage across half of secondary winding 22.

The function of resistor 48 and rectifier 50 is to produce a voltage of $-0.0185E_p$ across resistor $R_k$ (resistor 30) by the cancellation circuit. Looking into the tube at the cathode, the apparent resistance of the tube is $$r_t=\frac{1}{g_md}$$

where $g_m$=tube mutual conductance. Since $r_t$ is in parallel with $R_k$, the cathode-to-ground effective resistance is $$R_g=\frac{\frac{R_k}{g_md}}{R_k+\frac{1}{g_md}}=\frac{R_k}{1+R_kg_md}$$

Assuming no internal resistance in the rectifier 50, the voltage produced across the cathode resistor by $-E_p$ is $$e_{o1c}=\frac{-E_pR_g}{R_g+R_{48}}$$

where $R_{48}$=resistance of resistor 48.

Since $e_{o1}+e_{oc1}=0$ $$\frac{R_g}{R_g+R_{48}}=\frac{R_k}{R_p+R_k}=\frac{R_kd}{r_p+(\mu+2)R_k}$$

Solving for $R_{48}$, $$R_{48}=r_p\left[\frac{r_p+(\mu+2-d)R_k}{d(r_p+\mu dR_k)}\right]$$

In the cited example, where
$r_p$=65000, $\mu$=19, $d$=0.5 and $R_k$=1000,
then $R_{48}$=22,000 ohms.

Then 22,000 ohms would be a good starting point from which to start in adjusting the resistance of resistor 48. The actual value of resistance for resistor 48 will depend on more exact and actual values for $r_p$, $\mu$, $R_k$, and $d$, so that the final value of $R_{48}$ is best found experimentally. This same analysis applies to determining the value of resistance for resistor 44.

FIGURE 3 shows a modification of FIGURE 1 which provides for certain other irregularities which might occur in the modulator which would later turn up as distortion when the transmitted signal is detected at a receiver. In this embodiment, the subcarrier source $f_{s1}$ is transformer coupled to the grid 12 of tube 10 through a parallel arrangement of grid leak resistor 29 and coupling capacitor 28. The secondary of the transformer 52 is connected directly to the cathode 13 above the load resistor 30. Similarly, the subcarrier source $f_{s2}$ is transformer coupled to the grid 16 through a grid leak resistor-capacitor combination of resistor 37 and capacitor 36 with the secondary of the transformer 54 connected directly to the cathode above the cathode resistor 40. In this arrangement, it will be noted that if any grid current is drawn by either tube 10 or 14 such current appears across resistors 29 and 37, respectively, and none across the load resistors 30 and 40. This change would be necessary only if, for example, the drawing of grid current would have an appreciable effect and provide distortion in a detected output at the receiver.

The circuit of FIGURE 3 also includes a resistor 56 connected between the cathode 13 and the positive terminal of a source of potential 60 and a resistor 58 is connected between the cathode 17 and the positive terminal of the source of potential 60. This arrangement provides for the neutralization of any plate current which might flow owing to the initial velocity of the electrons from the cathodes of tubes 10 and 14 even when the external plate voltage is zero as when there is no modulation voltage present across transformer 20. This change would be necessary only if, for example, the presence of residual subcarrier voltage across the cathode resistors in the absence of modulation voltage across transformer 20 would be objectionable. If these factors did not provide an appreciable distortion or undesired residual output they may be dispensed with.

Additionally, the circuit of FIGURE 3 shows a radio frequency by-pass capacitor 62 connected between the anode 11 and ground and a radio frequency by-pass capacitor 64 connected between the anode 15 and ground. The capacitors 62 and 64 provide a low impedance to ground for subcarrier frequency signals. These capacitors could be dispensed with if the secondary winding of transformer 20 offers a low impedance to ground for the subcarrier signals.

Since other modifications varied to fit particular operating requirements and environments will be apparent to those skilled in the art, the invention is not considered limited to the examples chosen for purposes of disclosure and covers all changes and modifications which do not constitute departures from the true spirit and scope of this invention.

What I claim as new and desire to secure by Letters Patent of the United States is:

1. A modulator circuit for providing cancellation of modulating frequency components in the output thereof comprising, a first and a second electron discharge device each having a cathode, control grid and anode electrode, a transformer having a primary winding and a secondary winding which has a center tap connected to a common reference potential, a modulation signal applied to said primary winding, means connecting said anode electrodes to opposite ends of said secondary winding, a first load circuit connected to the cathode of said first electron discharge device, a second load circuit connected to the cathode of said second electron discharge device, means for applying a first signal to be modulated by said modulation signal to the control grid of said first electron discharge device, means for applying a second signal to be modulated by said modulation signal to the control grid of said second electron discharge device, first means coupled between the anode of said second electron discharge device and the cathode of said first electron discharge device for cancelling components of said modulating signal in said first load circuit, and second means coupled between the anode of said first electron discharge device and the cathode of said second electron discharge device for cancelling components of said modulating signal in said second load circuit.

2. The modulator circuit set forth in claim 1 in which said first and said second means comprises a serially connected resistor and a unilateral conducting device.

3. The modulator circuit set forth in claim 1 in which said means for applying a first signal to the control grid of said first electron discharge device and said means for applying a second signal to the control grid of said second device each comprises a transformer having a secondary winding which is connected on one end thereof to the cathode and on the other end thereof through a parallel combination of a grid leak resistor and capacitor to the control grid.

4. The modulator circuit set forth in claim 1 which includes a source of potential, and a pair of resistors each of which is connected between one of said cathodes and said source of potential.

5. The modulator circuit set forth in claim 3 which includes a source of potential, and a pair of resistors each of which is connected between one of said cathodes and said source of potential.

6. A modulator circuit for providing cancellation of modulating frequency components in the output thereof comprising, a first and a second electronic device each having input and output electrodes, a transformer having a primary winding and a secondary winding which has a center tap connected to a common reference potential, a modulation signal applied to said primary winding, means connecting one of said output electrodes of each device to opposite ends of said secondary winding, a first load circuit connected to the other output electrode of said first device, a second load circuit connected to the other output electrode of said second device, means for applying a first signal to be modulated by said modulation signal to the input electrodes of said first device, means for applying a second signal to be modulated by said modulation signal to the input electrodes of said second device, first means coupled between said one output electrode of said second device and the other output electrode of said first device for cancelling components of said modulating signal in said first load circuit, and second means coupled between said one output electrode of said first device and the other output of said second device for cancelling components of said modulating signal in said second load circuit.

7. The modulator circuit set forth in claim 6 in which said first and said second means comprises a serially connected resistor and a unilateral conducting device.

References Cited by the Examiner

UNITED STATES PATENTS

| | | | |
|---|---|---|---|
| 1,597,389 | 8/26 | Wilson | 332—60 |
| 2,419,615 | 4/47 | Weldon | 332—60 |

ROY LAKE, *Primary Examiner.*